United States Patent [19]

D'Aoust et al.

[11] Patent Number: 5,007,100
[45] Date of Patent: Apr. 9, 1991

[54] DIAGNOSTIC SYSTEM FOR A PARALLEL PIPELINED IMAGE PROCESSING SYSTEM

[75] Inventors: Robert D'Aoust, Detroit; Robert B. Cording, Livonia; Debora Y. Grosse, Ann Arbor; Kevin Jennings, Farmington Hills; Stephen R. Krebs, Ypsilanti Township, Washtenaw County; George E. Reasoner, Jr., Tecumseh; Gerald R. Smith, Farmington; David C. Williams, Ann Arbor, all of Mich.

[73] Assignee: Unisys Corporation, Bluebell, Pa.

[21] Appl. No.: 419,606

[22] Filed: Oct. 10, 1989

[51] Int. Cl.⁵ .................................................. G06K 9/54
[52] U.S. Cl. ...................................... 382/49; 382/41; 382/27
[58] Field of Search ..................... 382/49, 41, 57, 27, 382/1, 19, 7, 16, 8, 12; 358/498, 296

[56] References Cited

U.S. PATENT DOCUMENTS

| | | | |
|---|---|---|---|
| 4,484,349 | 11/1984 | McCubbrey | 382/49 |
| 4,524,455 | 6/1985 | Holsztynski et al. | 382/49 |
| 4,685,144 | 8/1987 | McCubbrey et al. | 382/49 |
| 4,811,413 | 3/1989 | Kimmel | 382/49 |

Primary Examiner—Michael Razavi
Attorney, Agent, or Firm—Harness, Dickey & Pierce

[57] ABSTRACT

A pipelined image processor is disclosed which contains a diagnostic apparatus which, under normal processing conditions, is coupled to and is in communication with resequencer, image processor, and transposer/compressor assemblies contained within the pipelined image processor. The diagnostic apparatus of this invention causes a diagnostic test pattern to be sent to the resequencer and image processor entities of the pipelined image processor and monitors the response thereof. This response is then used to detect faults which have occurred in these entities.

14 Claims, 7 Drawing Sheets

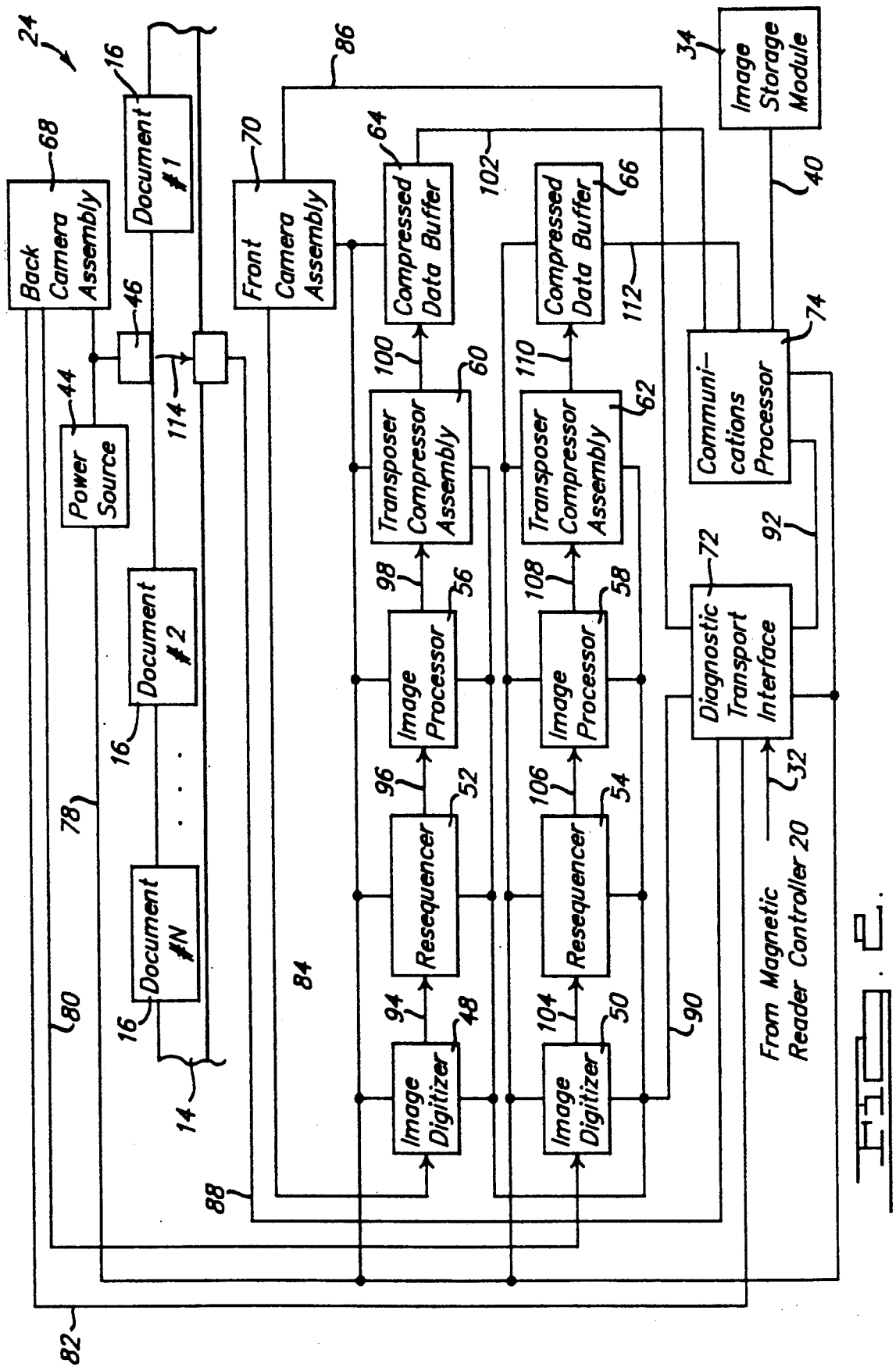

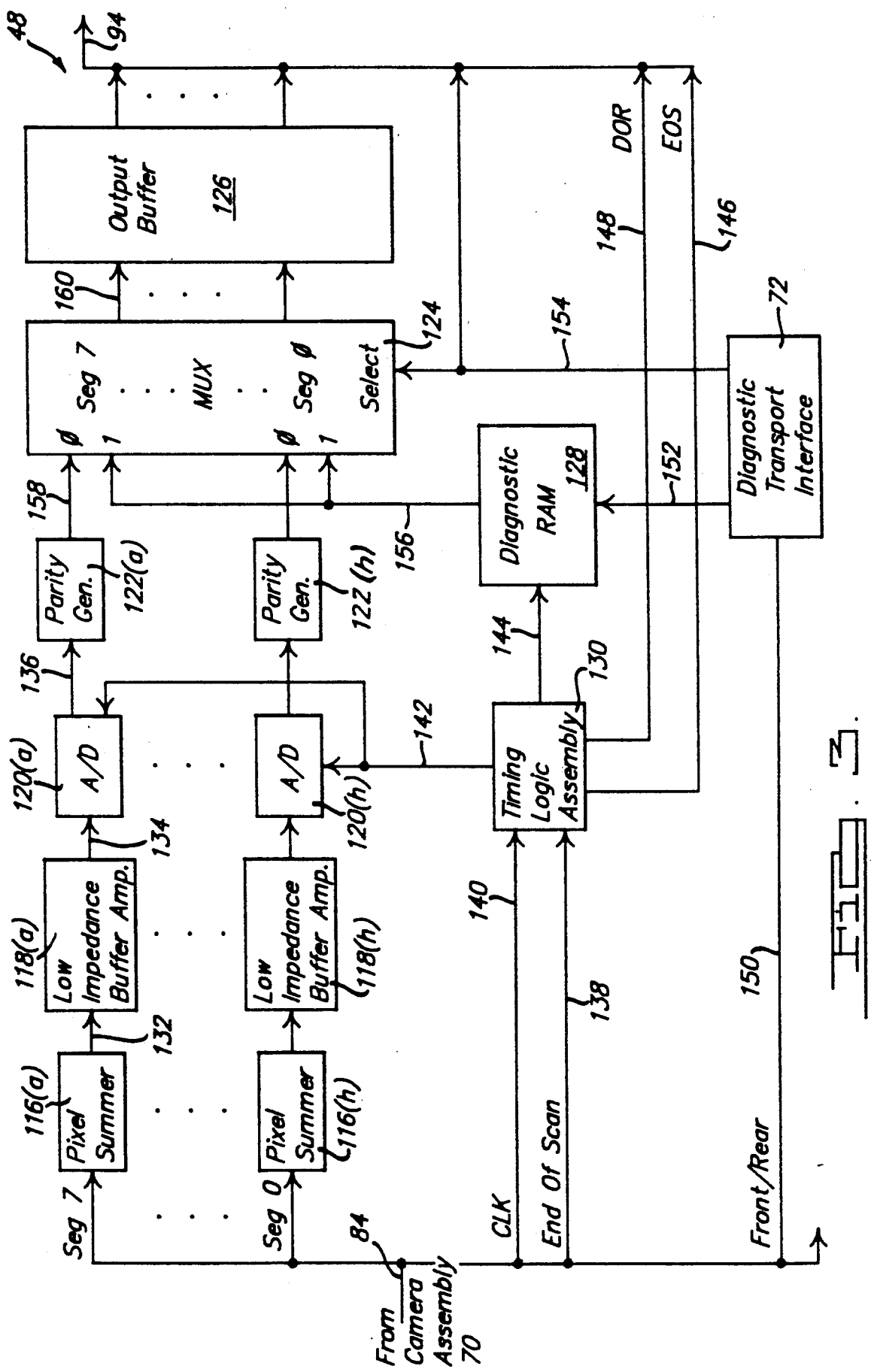

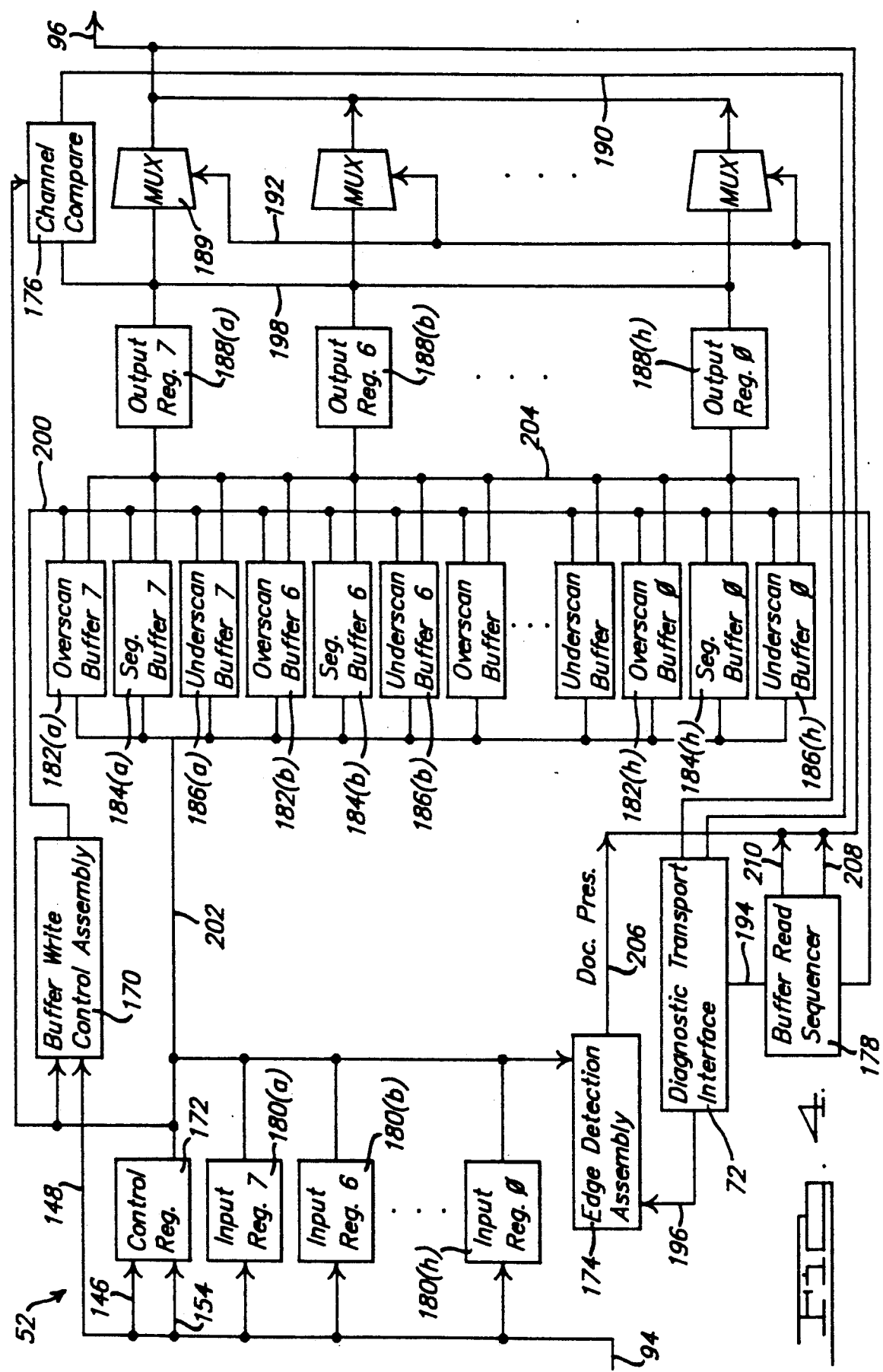

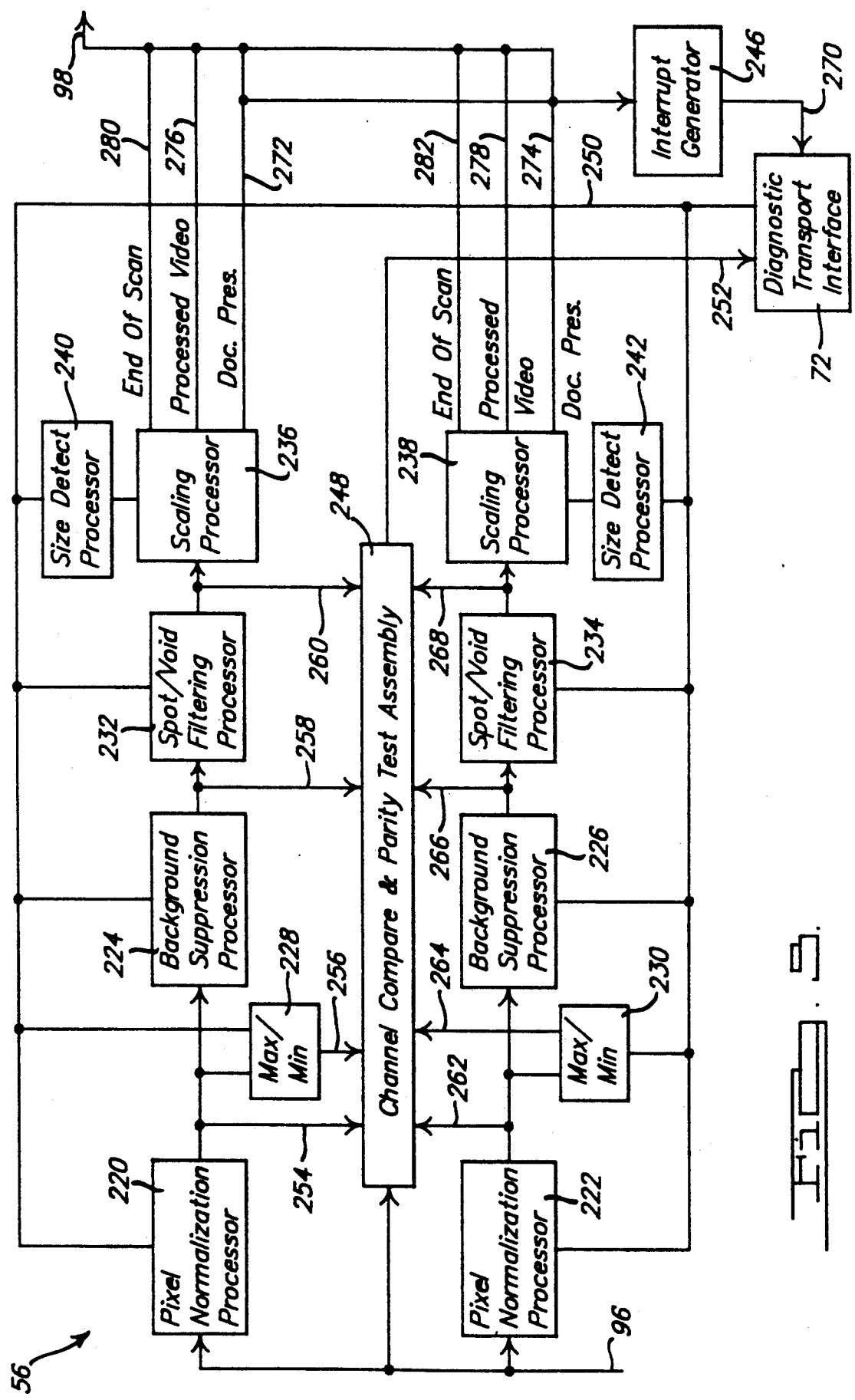

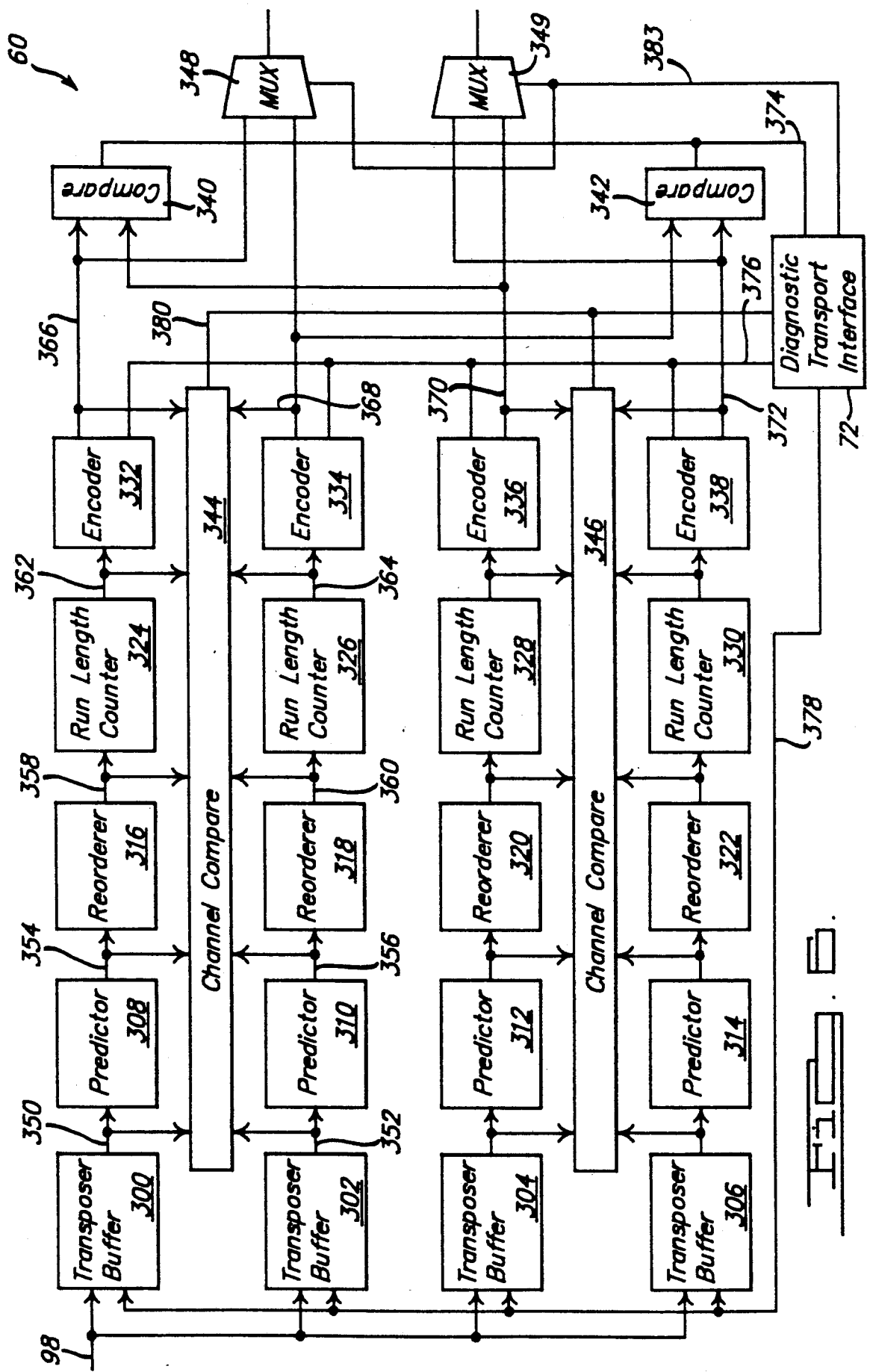

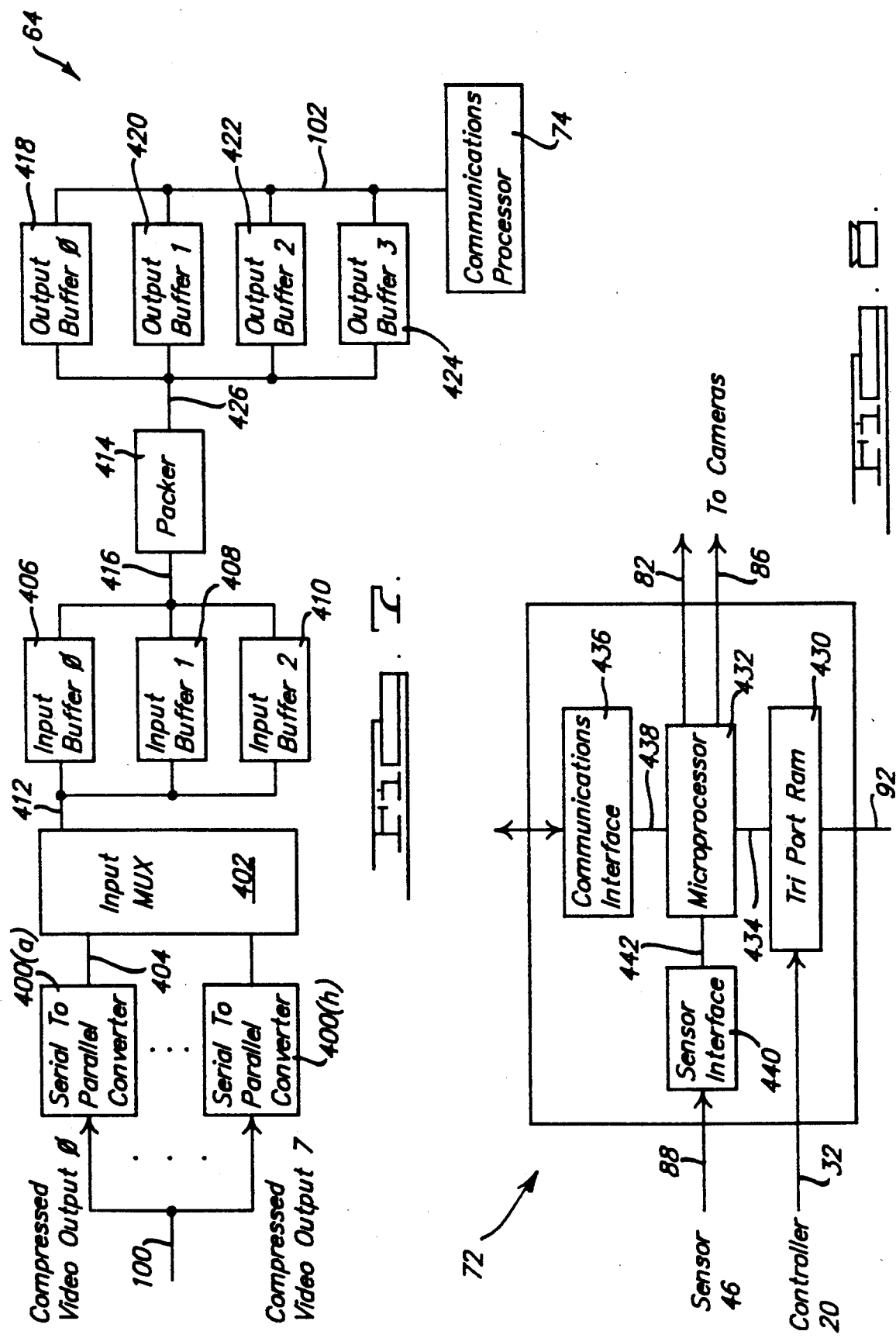

DIAGNOSTIC SYSTEM FOR A PARALLEL PIPELINED IMAGE PROCESSING SYSTEM

CROSS REFERENCE TO RELATED APPLICATIONS

This application is related to the following applications, which were filed of even date herewith and which are assigned to the same assignee as this application:
PARALLEL PIPELINED IMAGE PROCESSOR—Capo et al.;
IMAGE DATA PROCESSOR—Klein et al.;
METHOD AND APPARATUS FOR EFFECTING BACKGROUND SUPPRESSION OF IMAGE DATA—Klein et al.;
METHOD AND APPARATUS FOR EFFECTING SPOT/VOID FILTERING OF IMAGE DATA—Klein et al.;
METHOD AND APPARATUS FOR SCALING IMAGE DATA—Klein et al.;
METHOD AND APPARATUS FOR DETECTING DOCUMENT SIZE IN AN IMAGING SYSTEM—D'Aoust et al.;
APPARATUS FOR IMAGE DATA TRANSPOSITION AND COMPRESSION/DECOMPRESSION—Klein et al.;
METHOD AND APPARATUS FOR TRANSPOSING IMAGE DATA—D'Aoust et al.;
METHOD AND APPARATUS FOR LOSSLESS COMPRESSION AND DECOMPRESSION OF IMAGE DATA—Klein et al.

BACKGROUND OF THE INVENTION

1. Field of the Invention

This invention relates generally to image processing and more particularly to a method and apparatus for the parallel pipelined processing of acquired financial document image data.

2. Discussion

Financial documents, such as checks or drafts, usually contain a magnetic ink character recognition (MICR) codeline which is typically read by a sorter and which automatically sorts these documents into a plurality of bins. Prior to sorting, in current practice, these sorted documents are presented to banking personnel who physically handle the documents and mechanically enter the dollar amount associated therewith upon each document by the use of specialized amount entry equipment. Additionally, these individuals physically corrected incorrectly read MICR data associated with each of the sorted documents.

These prior techniques of utilizing a plurality of individuals to process financial documents have proved to be relatively costly and inefficient, in that many of these documents have been lost or destroyed during their physical handling by the aforementioned individuals, and the speed associated with the processing of the documents is limited to that associated with the processing capabilities of the individuals and the mechanical amount entry equipment they use.

SUMMARY OF THE INVENTION

According to the preferred embodiment of the present invention, a diagnostic system is disclosed for a parallel pipelined image processor which stores a diagnostic test pattern and, during periods of inter-document time gaps, causes this diagnostic testing pattern to be output and thereafter communicated to the resequencer, image processor, and transposer/compressor assemblies which are arranged in the pipelined image processor. Each of these processors is then made to respond to the diagnostic testing pattern and this response are then compared and the results of this comparison is sent to a diagnostic transport interface which then determines faults associated therewith. Additionally, in normal operation, the diagnostic transport interface, of this invention, is coupled to and is in communication with each of the entities arranged in the parallel pipelined image processor.

BRIEF DESCRIPTION OF THE DRAWINGS

For a more complete understanding of the present invention, relative to the advantages thereof, reference may be made to the following detailed description taken in conjunction with the accompanying drawings in which:

FIG. 2 is a block diagram of the parallel pipelined image processing system shown generally in FIG. 1;

FIG. 3 is a block diagram of an image digitizer shown generally in FIG. 2;

FIG. 4 is a block diagram of the resequencer shown generally in FIG. 2;

FIG. 5 is a block diagram of the image processor shown generally in FIG. 2;

FIG. 6 is a block diagram of the transposer/compressor assembly shown generally in FIG. 2;

FIG. 7 is a block diagram of the compressed data buffer shown generally in FIG. 2; and FIG. 8 is a block diagram of the diagnostic transport interface shown generally in FIG. 2.

DETAILED DESCRIPTION

Figure 1:
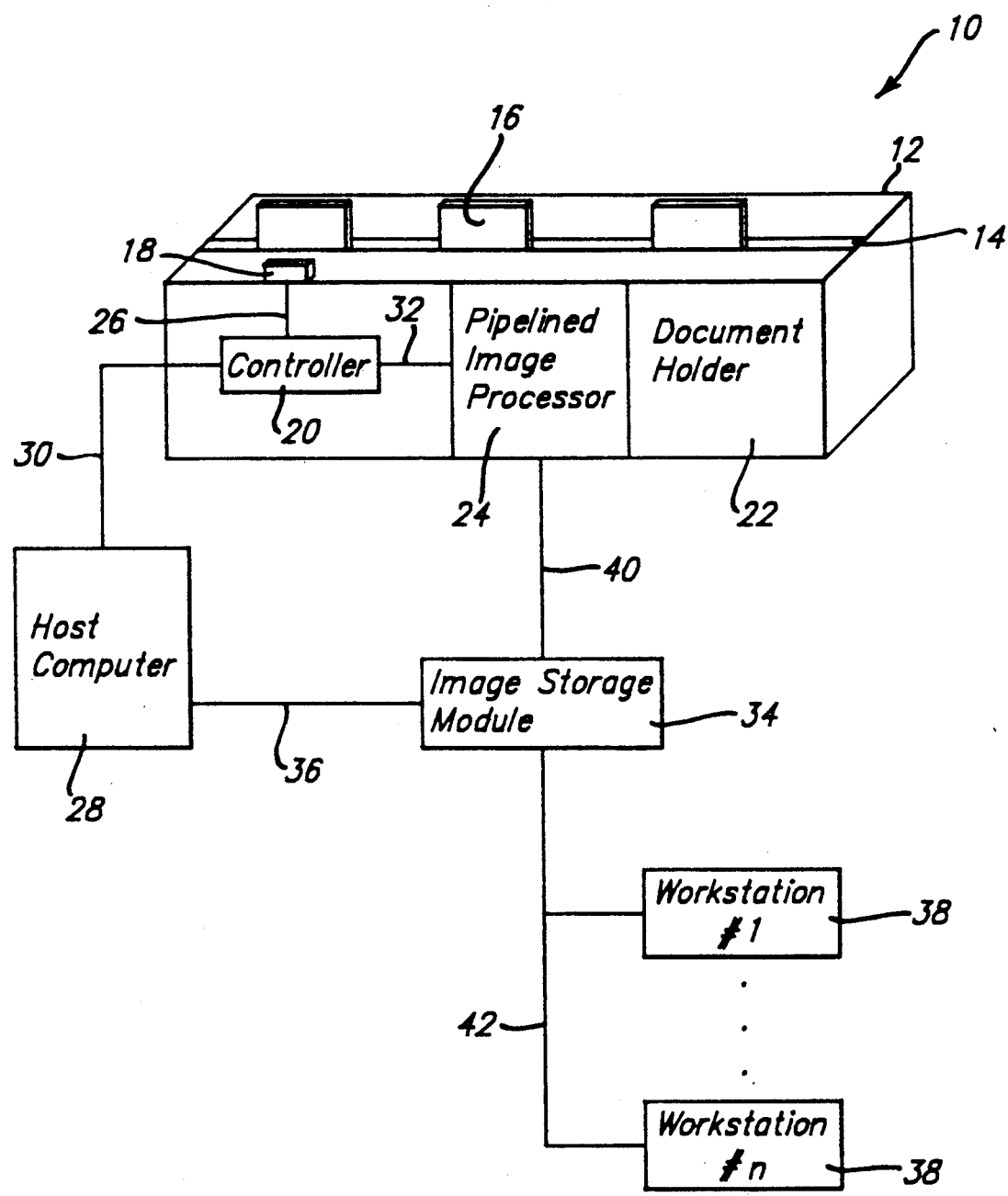
FIG. 1 is a block diagram of a typical document sorting system utilizing the parallel pipelined image processing system of the preferred embodiment of this invention.

Referring now to FIG. 1, there is shown a financial document sorting system 10 having a typical document sorter 12, which in the preferred embodiment of this invention, comprises a model DP1800 sorter which is manufactured by the UNISYS Corporation of Blue Bell, Pa.

Sorter 12 contains a track 14 into which a plurality of financial documents 16 traverse through and reside within, and further containing a magnetic character reader 18 and magnetic character reader controller 20. Additionally, sorter 12 contains a document holder 22 and the pipelined image processor 24 arranged in accordance with the teachings of the preferred embodiment of this invention.

Controller 20 is coupled to the reader 18 by signals on the bus 26, to a host computer 28 by signals on the bus 30, and to the pipelined image processor 24 by signals on the bus 32. The computer 28 is coupled to an image storage module 34 by signals on the bus 36, and the image storage module 34 is also coupled to the pipelined image processor 24 and to a plurality of workstations 38 by signals on the buses 40 and 42, respectively.

In operation, documents 16 sequentially traverse by reader 18 which reads a typical code appearing upon the usual MICR codeline strip which is normally placed upon each of the documents 16. This code is then sent to the computer 28 by signals on the bus 30 for storage therein and to the processor 24 by signals on the bus 32.

As each of the documents 16 further travel within the track 14, they pass in close proximity to processor 24 which creates an image thereof and sends this processed image, by signals on bus 40, to the image storage module 34 for storage therein. After passing by the processor 24, each of the documents are then sorted, by sorter 12, in the usual way (based upon the contents of the MICR codeline) and are held within the document holder 22.

After a typical block of the documents 16 has been sorted in the aforementioned manner, the workstations 38, by signals on the bus 42, sequentially request the aforementioned document images from the storage module 34. These images are then downloaded to the workstations 38, by use of signals on the bus 42, along with their associated magnetic code data obtained from host computer 28.

After these images are captured by the workstation 38, individual operators electronically enter the dollar amount associated with each document and electronically resolve any difficulties associated with the reading of the MICR code. Each image's dollar amount and associated corrections then form a single record which is then sent to the storage module 34, by use of signals on the bus 42, where it may be later accessed for use in automatically placing the dollar amount and corrections upon the sorted documents. Therefore, the aforementioned document sorting system 10 substantially eliminates the physical handling of the plurality of documents 16 when the associated dollar amount is placed thereon thusly increasing the efficiency and timeliness of the overall document sorting system 10.

Referring now to FIG. 2, there is shown parallel pipelined image processor system 24 arranged in accordance with the principles of this invention and contained within the document sorting system 10 as shown in FIG. 1.

Specifically, parallel pipelined image processing system 24 contains a power source 44 and a typical photo diode sensing assembly 46 which is positioned on opposite sides of the track 14 thereby sensing the presence of one of the plurality of documents 16, as the document 16 passes along track 14. Parallel pipelined image processing system 24 further contains image digitizers 48 and 50, resequencers 52 and 54, image processors 56 and 58, transposer/compressor assemblies 60 and 62, compressed data buffers 64 and 66, a back camera assembly 68, a front camera assembly 70, a diagnostic transport interface 72, and a communications processor 74.

Power source 44 is coupled to entities 46–74 by bus 78 to provide electrical power thereto. Back camera assembly 68 is coupled to the input of image digitizer 50 by signals on bus 80 while also coupled to the diagnostic transport interface 72 by signals on bus 82. Front camera assembly 70 is coupled to the input of the image digitizer 48 by signals on bus 84 while being coupled t the diagnostic transport interface 72 by signals on bus 86. The optical sensor assembly 46 is coupled to the diagnostic transport interface 72 by signals on bus 88. Entities 48–62 are coupled to the diagnostic transport interface 72 by signal on bus 90 while the diagnostic transport interface 72 is additionally coupled to communications interface 74 by signals on bus 92. Additionally, the diagnostic transport interface 72 is coupled to the magnetic reader controller 20 of sorter 12 by signals on bus 32.

The output of image digitizer 48 is coupled to the input of resequencer 52 by signals on bus 94 while the output of the resequencer 52 is coupled to the input of image processor 56 by signals on bus 96. The output of the image processor 56 is coupled to the input of transposer/compressor assembly 60 by signals on bus 98 while the output of the transposer/compressor assembly 60 is coupled to the compressed data buffer 64 by signals on bus 100. The output of the compressed data buffer 64 is coupled to communications processor 74 by signals on bus 102.

The output of the image digitizer 50 is coupled to the input of the resequencer 54 by signals on bus 104 while the output of the resequencer 54 is coupled to the input of the image processor 58 by signals on bus 106. The output of the image processor 58 is coupled to the input of the transposer/compressor assembly 62 by signals on bus 108 while the output of the transposer/compressor assembly 62 is coupled to the input of the compressed data buffer 66 by signals on bus 110. The communications processor 74 is coupled to the image storage module by bus 40. The output of the compressed data buffer 66 is coupled to the communications processor by signals on bus 112.

It should, at this point, be noted that in the preferred embodiment of this invention, entities 48, 52, 56, 60, and 64 represent a single document image pipelined processing assembly or a "pipe" associated with the acquired image of the front of one of the plurality of documents 16. The back of that same document 16 has another document image pipelined processing assembly or a "pipe" associated with it and that is defined by entities 50, 54, 58, 62 and 66.

In operation, the plurality of documents 16 traverse track 14 thereby sequentially passing by photo detector sensing assembly 46. Typically, there is a window of time between the exiting of one of the plurality of documents 16 from the light path 114 defined by sensor assembly 46 and the entering of another one of the plurality of documents 16 within the same path 114. This inter-document time gap therefore also relates to a defined window of time in which parallel pipelined image processing system 24 performs diagnostic testing without degrading the efficiency of the document sorting system 10 shown generally in FIG. 1.

As each of the plurality of documents 16 passes through sensor assembly 46, a signal is generated on bus 88 to the diagnostic transport interface 72 informing the interface that a document 16 is on its way to camera assemblies 68 and 70. Before that same document arrives at the camera assemblies 68 and 70, the diagnostic transport interface 72 sends a signal on the bus 90 to enable image digitizers 48 and 50. To halt the diagnostic testing of system 24, interface 72 then sends another signal on bus 90 activating the leading edge of the edge detection assembly of the resequencers 52 and 54, to be later explained. Additionally, when the signal on bus 88 indicates that the document has exited the sensing assembly 46, then diagnostic transport interface 72 issues a signal on bus 90 to the resequencers 52 and 54 activating the trailing edge of the edge detection assembly. After a delay suitable to ensure that the document 16 has cleared both camera assemblies 68 and 70, interface 72 issues another signal on bus 90 to image digitizers 48 and 50 to initiate diagnostic testing of the parallel pipelined image processing system 10. Prior to this point, the document 16 had passed through reader 18 and has had its MICR codeline read by reader 18, of FIG. 1, and has been assigned a document identification code by sorter 12. The magnetic code and document identification code are then sent to interface 72, by signals on bus 32, by controller 20.

After one of the plurality of documents 16 has passed the sensor assembly 46, it is placed by track 14 between camera assemblies 68 and 70. Each of the camera assemblies 68 and 70, in one embodiment of this invention, are comprised of a charge coupled photo diode array manufactured by the EG and G Reticon Corporation which is located at 345 Potrero Avenue, Sunnyvale, Ca. 94086-4197 and which is referred to as model number RL1288D. Camera assemblies 68 and 70 further contain a plurality of lamps for illuminating the document 16 and a plurality of lenses coupled to the photo diode array. The charged coupled photo diodes within assemblies 68 and 72 each capture the image of a vertical strip associated With the document 16. The strip has a width of approximately 0.005 inches. As the document 16 passes entirely through the path of camera assemblies 68 and 70, a plurality of these vertical strips of image data is generated by each of the assemblies 68 and 70 and are serially and respectively passed to the image digitizers 48 and 50.

Each of these camera assemblies 68 and 70 typically produce this aforementioned vertical strip in a sequence of eight separate segments which represent images associated with the entire vertical dimension of the document 16. The charge coupled devices within assemblies 68 and 70 are typically segmented in order to allow rapid shifting of analog image data out of the devices. It should also be noted that, in one embodiment of this invention, the front camera assembly 70 produces an image of document 16 which results from a scan beginning at the bottom of the document 16 to the top thereof progressing from right to left. However, the back camera assembly 68 produces an image of the backside of the same document 16 by scanning from the top of the document 16 to the bottom thereof while progressing from left to right. The following discussion will be related to the parallel image processing pipeline associated with the front camera assembly and containing entities 48, 52, 56, 60 and 64 therein. It should, however, be realized by one of ordinary skill in the art that the following discussion is equally applicable to the parallel pipelined image data system associated with back camera assembly 60 and containing entities 50, 54, 58, 62 and 66 therein.

The vertical strips of image data associated with the front of the document 16 are sequentially input into the image digitizer 48 by signals on bus 84 which emanate from front camera assembly 70. The data on bus 84 is organized into the aforementioned eight segments of data with each segment having its even and odd pixels placed upon separate buses. The image digitizer 48 then sequentially mixes and digitizes all of the received image strips and passes the eight segments of digitized image data associated with each of the vertical image strips to the resequencer 52 by signals on the bus 94. The resequencer 52 then receives the eight segments of digital data appearing on the bus 94 and by combining pixels from adjacent segments, creates separate expanded parallel processing channels. Each segment is expanded into a channel to allow image processing operations to be performed in the image processor 56 without causing discontinuities at segment boundaries. These parallel image channels are then placed upon the bus 96 and input into the image processor 56. The image processor 56 then processes these separate channels of image data in parallel This parallel processing of the image data allows the pipelined image processing system 24 to work in a very efficient and timely manner. The processed image data is then output from the image processor 56 in parallel channels onto bus 98 to the transposer/compressor assembly 60. In one embodiment of this invention, the image processor 56 utilizes the processing techniques of normalization, background suppression, spot/void filtering, and scaling to the data present upon the bus 96.

The transposer/compressor assembly 60 then reorders the processed image data that was associated with the vertical strips (columns) of the front of the document 16 into horizontal strips (rows) by a transposition process. The transposition process increases the efficiency of the subsequent compression process by reducing the number of pixels whose values cannot be correctly predicted because of discontinuities at the leading and trailing edge of the acquired image and at channel boundaries associated therewith. The amount of reduction, of these pixels, is approximately:

% of pixel reduction factor =

$$\frac{\text{Number of rows within the image}}{\text{Number of columns with the image}}$$

The transposition process also reduces the overall size of the compressed image by placing the edge discontinuities associated therewith, further apart. This reduction in overall size has been found to be very significant in a substantially white image.

The data in the horizontal strips are then compressed, and this compressed data is sent to the compressed data buffer 64 by placing these parallel channels of data on the bus 100. The compressed data buffer 64 then receives these parallel channels of compressed data and rearranges them into one large block for transfer to the processor 74 by signals on bus 102 and thereafter to the image storage module 34 by signals on bus 40. Once this block of compressed data is received, the image storage module 34 may store the data therein or may alternatively place the compressed data on the bus 42 for communications to the work stations 38 (FIG. 1). The communications interface may be one of a plurality of types including those associated with fiber optic or coaxial cable media.

Each of the entities 48, 52, 56, 60 and 64 will now be explained in greater detail. Additionally, the use of the previously defined inter-document time gap for the performance of a diagnostic test upon the pipelined assembly 24 will also be described herein.

Referring now to FIG. 3, there are shown details of the image digitizer 48 of FIG. 1. In the preferred embodiment of this invention, digitizer 48 comprises eight individual pixel summers 116(a-h), eight low impedance buffers 118(a-h), eight analog to digital converters 120(a-h), eight parity generators 122(a-h), a multiplexer 124, an output buffer 126, a diagnostic RAM 128, and a timing logic assembly 130.

Each segment of the image data associated with a vertical image slice of the front of document 16 has an associated pixel summer 116(a-h), a low impedance buffer amplifier 118(a-h), an analog to digital converter 120(a-h), and a parity generator 122(a-h) associated therewith. The following discussion details the interconnection and use of entities 116(a), 118(a), 120(a), and 122(a) with the eighth physical and hierarchically highest segment hereinafter referred to as the "seventh segment" since these segments are usually identified by a number from zero to seven. It should be realized by one of ordinary skill in the art that the following discussion is equally applicable to the other eight segments of the output of camera assembly 68 and to the other seven segments generated by camera assembly 70 (FIG. 2) as well.

The seventh segment of image data acquired by camera assembly 70 (FIG. 1) is placed onto the bus 84 as analog data and is input into the pixel summer 116(a). Since the image data associated with the seventh segment of document 14 is segregated into a plurality of even and odd pixels by camera assembly 70, the pixel summer 116(a) mixes these even and odd pixels such that it produces an analog output signal on bus 132 which represents an ordered arrangement of the image pixels in time, according to their physical location within the seventh segment. The analog output signal on bus 132 is then input into the low impedance buffer amplifier 118(a) by signals on bus 132. The low impedance buffer amplifier 118(a) is necessary in order to allow the analog to digital converter 120(a) to operate in an accurate manner. The output of the low impedance buffer amplifier 118(a) is then input to the analog to digital converter 120(a) by signals on bus 134. The analog to digital converter 120(a) then digitizes these analog pixels and places the resulting digitized data onto bus 136 which is input into parity generator 122(a).

It should be realized at this point that there are two additional signals associated with sYnchronization of data on bus 84. The first signal represents an end-of scan signal on lead 138, which is typically produced by camera assembly 70 (FIG. 3) as a complete single vertical scan of the document 16 is output from assembly 70 onto bus 84. End-of-scan signal on lead 138, is input from bus 84 and thereafter to the timing logic assembly 130. The second signal is a clock signal on lead 140 which is used to identify the individual pixels. It is produced by the camera assembly 70 and is output upon the bus 84. The clock signal on lead 140 is input to the timing logic assembly 130.

Timing logic assembly 130 then produces an output signal on bus 142 which is input into each of the analog to digital converters 120(a-h) and which enables converters 120(a-h) to digitize the incoming pixels represented by signals on the bus 134. Timing logic assembly 130 is further coupled to the diagnostic RAM 128 by signals on bus 144 which represent a clock that is substantially similar to the signal on bus 140. Assembly 130 also produces a synchronization signal on lead 146 which is activated to mark the last pixel output from buffer 126 onto bus 94, and further produces a data output ready signal on lead 148 which represents a clock pulse for every analog to digital conversion of each of the pixels associated with signals on the bus 134, which are subsequently latched into buffer 126.

Bus 84 has an additional signal on line 150 thereon which emanates from camera assembly 70 (FIG. 1) and which typically represents the physical placement of camera assembly 70 in either the front or the back of document 16. Signal 150 is input into the diagnostic transport interface 72 by means of bus 90 (FIG. 2) and which stores the signal 150 and which uses the same for later control of the resequencer 52 (FIG. 2). The diagnostic transport interface 72 is further coupled to the diagnostic RAM 128 by signals on bus 152 and is also coupled to the multiplexer 124 by signals on bus 154. Diagnostic RAM 128 is coupled to the multiplexer 124 by signals on bus 156.

The diagnostic RAM 128 comprises, in one embodiment, a 32K × 8 bit static random access memory assembly, having associated address generation and control assemblies which allow the diagnostic transport interface 72 to sequentially write data thereto by means of bus 152 and which allows RAM 128 to transmit contained data to multiplexer 124, by signals on bus 156.

Parity generator 122(a) generates standard parity codes associated with the digital data received by signals on bus 136 and inputs the received digital data and parity into multiplexer 124 by signal on bus 158. During normal image data processing associated with document 16, multiplexer 124 is directed to output signals present on input bus 158 to output buffer 126 through the use of signal on bus 160. The directive emanates from the diagnostic transport interface 72 by signals on bus 154.

Upon receipt of the data represented by signals on bus 160, the output buffer 126 stores the same and subsequently outputs this segmented digital data on to bus 94 which is input into the resequencer 52 of FIG. 4.

The diagnostic RAM 128 is typically preloaded with a standard test pattern by the diagnostic transport interface 72 through bus 152. During the aforementioned inter-document time gaps associated with the traversal of documents 16 along the track 14 (FIG. 1), the diagnostic transport interface 72 will normally cause the diagnostic RAM 128 to transmit this test pattern to multiplexer 124 by the use of bus 156. Diagnostic transport interface 72 causes this downloading of testing information to multiplexer 124 by the use of a control signal on bus 154 after receiving signals on bus 88 from sensor assembly 46 (FIG. 1) informing interface unit 72 that a document 16 is not present at the camera assembly 70. Additionally, the diagnostic transport interface 72·causes the multiplexer 124 to output the testing data represented by the signals on bus 156 to its output bus 160 by use of a control signal on bus 154 thereto. This will result in bus 160 carrying identical test data for every one of the eight channel segments. This testing data is then placed into the output buffer 126 and is subsequently transmitted to the resequencer 52 (FIG. 2) in a manner previously alluded to for the digital data, by the use of the bus 94. It should be noted that signals 146 and 148 and that signals on bus 154 are also placed onto the bus 94 for transmission to the resequencer 52 (FIG. 2).

Referring now to FIG. 4, resequencer 52 is shown as containing a buffer write control assembly 170, a control register 172, an edge detection assembly 174, a channel compare assembly 176, a buffer read sequencer assembly 178, eight segment input registers 180(a-h), eight overscan buffers 182(a-h), eight segment buffers 184(a-h), eight underscan buffers 186(a-h), eight output registers 188(a-h), and a plurality of multiplexers 189. Signals on bus 94 are coupled to the control register 172, input registers 180(a-h), buffer write control assembly 170.

The output of the channel compare assembly 176 is placed onto bus 190 and is coupled to the diagnostic transport interface 72. The diagnostic transport interface 72 is also coupled by signals on bus 192 to each of the plurality of multiplexers 189 and is further coupled by signals on bus 194 to the buffer read sequencer assembly 178 and by signals on bus 196 to the edge detection assembly 174. Each of the outputs associated with output registers 188(a-h) are coupled to the bus 198 which is further coupled to the channel compare assembly 176 and to the input of each of the multiplexers 189. The output of both the buffer write control assembly 170 and an output of the buffer read sequencer 178 are coupled to each of the buffers 182(a-h), 184(a-h), and 186(a-h) by signals on bus 200. Additionally, registers 172 and 180(a-h) are coupled to buffers 182(a-h), 184(a-h), 186(a-h), write control assembly 170, channel compare assembly 176 and to edge detection assembly 174 by signals on bus 202. The inputs of registers 188(a-h) are coupled to registers 182(a-h), 184(a-h), and 186(a-h) by signals on bus 204. The output of edge detection assembly 174, buffer read sequence assembly 178, and multiplexers 189 are coupled to bus 96 and are transmitted to the image processor 56.

In operation, digital image data represented by each of the individual segments associated with camera assembly 70 (FIG. 1) (which were placed upon bus 94 by digitizer 48 of FIG. 2) are input into one of the input registers 180(a-h).

Video signals enter the edge detection assembly 174 by bus 202. Assembly 174 detects the leading and trailing edges of each of the documents 16 whose image is obtained by camera assembly 70 (FIG. 1). The diagnostic transport interface 72 enables the detector assembly 174 and loads threshold data to it by means of signals on bus 196 and enables detection assembly 174 to look for the leading edge of the document 16.

This threshold value is compared with the obtained video data by assembly 174 in order to see if the difference between the sum of the pixel gray-scale values in the current video scan and the sum of the pixel gray-scale values in the sixteenth previous vertical scan is greater than this loaded threshold value. A document present signal 206 is then transmitted by assembly 174, on bus 96, if a leading edge is detected, in this manner, in any of the channels. After activating signal 206, assembly 174 must continue to monitor document 16 in order to recognize its trailing edge. That is, signal 206 is deactivated, by assembly 174, if a trailing edge of the same document 16 is detected in a similar manner on at least two of the segments.

Using the incoming video data, upon bus 202, is important to detect an edge, because it has been found that the edge of the document 16 can be found more accurately than by using sensor assembly 116 to do the same. This increased accuracy translates into a reduced size of the subsequent compressed image data associated therewith because less image data relating to the track background is associated with the obtained document image.

Additionally, the end-of-scan signal on lead 146 (FIG. 3) and the signal on bus 154 which were placed upon bus 94 within the image digitizer 48 (FIG. 3) are input into the control register 172 and are subsequently placed onto bus 202 such that they are input into buffers 182(a-h), 184(a-h), and 186(a-h). They are subsequently output therefrom by signals on bus 200 and are coupled to the buffer read sequencer assembly 178.

The buffer read sequencer 178 is a sequential state machine that controls the unloading of buffers 182(a-h), 184(a-h), and 186(a-h) in a manner that will augment the segment video data on bus 202, by adding a number of pixels of overscan and underscan thereby forming a processing channel.

When the buffer write control 170 has finished writing an entire segment of video data to buffers 182(a-h), 184(a-h), and 186(a-h), it signals the buffer read sequencer 178, over bus 200, that this task has been completed. Upon receipt of this completion signal, sequencer 178, in one embodiment, allows approximately ten pixels of data to be output from underscan buffers 186(a), then allows approximately 128 pixels of data to be output from buffer 184(a) and then allows approximately ten pixels of data to be output from the buffer 182(a). This process continues in parallel for each channel of data, until the aforementioned data has been output from buffers 182(b-h), 184(b-h) and 186(b-h) in a similar manner. Following this data output sequence, the end-of-scan signal 208 is output, onto bus 96, by sequencer 178, such that its output coincides, in time, with the last pixel output from buffer 182(h) after it passes through register 188(h) and one of the multiplexers 189 onto bus 96. Sequencer 178 activates the test signal on bus 210 if the signal on bus 154 is coupled to bus 200.

Buffer read sequencer 178 also checks to make sure that signals 146 and 148, originating on digitizer 48 (FIG. 1) are simultaneously available from buffers 182(a-h), 184(a-h), 186(a-h) since they were simultaneously input thereto by signals on bus 202. If a loss of synchronization is detected, a fault is reported to the diagnostic transport interface 72 by signals on bus 194.

Read sequencer 178 outputs data from buffers 182(a-h), 184(a-h), and 186(a-h) at a rate sufficiently high in order to ensure that buffers 182(a-h), 184(a-h), and 186(a-h) will never overflow. In one embodiment, the rate of video data flow into buffers 182(a-h), 184(a-h), and 186(a-h) is approximately 64 million pixels per second. That is, eight pixels are presented, one per input register 180(a-h), approximately every 125 nanoseconds. The output rate of buffers 182(a-h), 184(a-h), 186(a-h), and 188(a-h) is approximately 80 million pixels per second. That is, eight pixels are presented, one per channel, at the output of each of the registers 188(a-h) approximately every 100 nanoseconds.

Within the resequencer 52, each of the input registers 180(A-H) is uniquely associated with an overscan buffer 182(a-h), a segment buffer 184(a-h), and an underscan buffer 186(a-h). The following discussion will center on the operation of the input register 180(a) associated with the eighth segment of data received from camera assembly 70 (FIG. 2) that was digitized by the digitizer 48 (FIG. 2). It should be noted by one of ordinary skill in the art that this discussion will be substantially the same for the other input registers 180(b-h) associated with other segments of the camera assembly 70.

Specifically, input register 180(a) transmits the digital image data to its associated segment buffer 184(a). The storage of this transmitted digital data from input register 180(a) is controlled by signals on bus 200 from the buffer write control 170 in response to signals on bus 94. That is, signals on bus 200 enable the segment buffer 184(a) to receive and store the digital data contained within input register 180(a). The segment buffer 184(a) stores an entire segment of video data. Additionally, the underscan buffer 186(a), uniquely associated with the input register 180(a), is made to contain approximately the last 10 pixels of data which were originally stored within the input register 180(b) associated with the segment which is hierarchically placed one segment below the seventh segment (i.e., the sixth segment). Underscan buffer 186(a) is enabled by a signal on bus 200 to accept the digital data which is stored in input register 180(a) associated with the sixth segment of the video image. Additionally, the overscan buffer 182(a) associated with input register 180(a) of the seventh segment would normally be made to accept approximately the first 10 pixels of data from the input register associated with a segment of the video image which is placed hierarchically above that. However, since input register 180(a) which is associated with the seventh segment of the image is hierarchically superior to all other input registers 180(b-h), its associated overscan buffer 182(a) is made to contain 10 pixels of zero data. The same is true with the underscan buffer 186(h) associated with input register 180(h) which itself is associated with segment number zero of the video image produced by camera assembly 70 (FIG. 2), which is hierarchically inferior to all other produced segments.

The data contents of the associated buffers 182(a), 184(a), and 186(a), which are uniquely associated with input registers 180(a), are then sequentially clocked onto bus 204 and placed into output register 188(a). Output register 188(a) is associated with the seventh segment of the image obtained from camera assembly 70 (FIG. 2). Under the co-ordination of the buffer read sequencer 178, the buffer 186(a) is first emptied followed by buffer 184(a) then the buffer 182(a). Therefore, the cooperation of registers 180(a) and 188(a) with buffers 182(a), 184(a) and 186(a), provides for a single unique processing channel associated with the seventh segment of the camera assembly 70. Each of the other segments associated with the camera assembly 70 are simultaneously expanded into similar unique channels and all of these unique channels are individually placed upon the bus 198 and thereafter into a unique one of the plurality of multiplexers 189.

For the following discussions, a channel of data is considered to be a sequential string of pixels consisting of underscan pixels, segment pixels, and overscan pixels. The eight channels of pixel data are constructed simultaneously by the aforementioned action of read sequencer 178. The formation of channels from the segment data is essential to the operation of parallel pipelined image processor 24. That is, image processing operations which are functions of pixels within a region, must process the acquired image including the discontinuities at the edges of each of the segments thereof. Adding underscan and overscan pixels, to each segment, allows the image processing operations to process these added pixels as well. Discontinuities still exist at the boundary of the channel (i.e. at the top of the overscan portions and at the bottom of the underscan portion), however, any image artifacts produced by them are restricted to the overscan and underscan region of the segment channel, provided that the overscan and underscan portions are sufficiently deep. After image processing upon the segment channel has been completed, the resulting overscan and underscan pixels are stripped off leaving only the processed segment data intact.

Since channel compare assembly 176 is coupled to the bus 198, during the period of inter-document time gaps, the testing signal on bus 154 (FIG. 3) which Was previously placed onto bus 94 is used to enable assembly 176 to accept all of the outputs of registers 188(a-h) so that these outputs may be compared and the results of this comparison may be placed upon the bus 190 to the diagnostic transport interface 72. Such testing may allow a user of pipelined processing arrangement 24 to periodically determine if the resequencer 52 is operationally sound. Additionally, diagnostic transport interface unit 72, by the use of signals on bus 192, may cause the outputs of each of the registers 188(a-h) to be reorientated before they are sent to image processor 56 (FIG. 2) in order to reflect the physical placement of the individual camera 70 (FIG. 2). That is, if signal 150 (FIG. 3) reflected a rear Camera placement, then diagnostic interface unit 72 would issue a command on bus 192 to the plurality of multiplexers 192 to reverse the register outputs on bus 198 to reflect the relative scanning motion of the camera with respect to the rear of the scanned document 16. If signal 150 represented a frontal position of camera assembly 70 then diagnostic transport interface 72, by means of a signal on bus 192, Would allow the plurality of multiplexers 189 to pass the outputs of registers 188(a-h) to the bus 96 in a normal or non-inverted sequence. That is, the reorientation associated with the back camera will cause the multiplexer 189 which normally outputted data of the seventh segment to now output data of the zero segment (i.e. segment number "0") and data associated with the sixth segment would be outputted to a multiplexer 189 associated with the first segment, and so on.

Because the rate at which scans of the document 16 are made is directly proportional to the speed that the document 16 travels through track 14 (FIG. 2), a document image processor 24 which processes images from documents 16 having a slower track speed would not have as many image processing channels as it would if the document 16 were traveling faster through track 14.

In one embodiment then, the diagnostic transport interface 72 directs the sequencer 178, by signals on bus 194, to create four channels of data (instead of eight) from the eight segments of video data. In this operation, the sequencer 178 performs as before except two segments of data are placed between single overscan and underscan buffer 182(a-h) and 186(a-h) respectively and data is output to only four of the eight registers 188(a-h). For example, the hierarchically highest channel would contain approximately ten underscan pixels from the top of the data normally contained within the fifth segment and contained in underscan buffer 186(b) followed by the data normally contained within the sixth segment register 184(b), followed by the data contained within the seventh segment register 184(a), and followed by approximately ten overscan pixels of data normally contained within register 182(a). Another embodiment of this invention allows for only two channels, each containing four segments of data, while operating in a substantially similar fashion.

Referring now to FIG. 5, there is shown further details of the image processor 56 of FIG. 2 associated with pipelined image processing system 24 and containing pixel normalization processors 220 and 222, background suppression processors 224 and 226, maximum/minimum value accumulator processors 228 and 230, spot/void filtering processors 232 and 234, scaling processors 236 and 238, size detection processors 240 and 242, an interrupt generator 246, and a channel compare and parity test assembly 248.

Specifically, normalization processors 220 and 222, along with assembly 248 are coupled to signals on bus 96, while processors 220, 222, 224, 226, 228, 230, 232, 234, 236, 238, 240 and 242 are coupled to the diagnostic transport interface unit 72 by signals on bus 250. Additionally, the output of assembly 248 is coupled to the diagnostic transport interface 72 by signals on bus 252. Processor 220 is coupled to assembly 248, processor 224, and to processor 228 by signals on bus 254, while processor 228 coupled to assembly 248 by signals on bus 256. Processor 224 is coupled to processor 232 and to assembly 248 by signals on bus 258 while processor 232 is coupled to assembly 248 and processor 236 by signals on bus 260.

Processor 222 is coupled to processor 230, processor 226, and assembly 248 by signals on bus 262 while processor 230 is coupled to assembly 248 by signals on bus 264. Processor 226 is coupled to processor 234 and assembly 248 by signals on bus 266 while processor 234 is coupled to processor 238 and assembly 248 by signals on bus 260. Interrupt generator 246 is coupled to the diagnostic transport interface unit 72 by signals on bus 270 and is coupled to the output of processors 236 and 238 by bus 98.

In operation, each of the processors 220, 222, 224, 226, 228, 230, 232, 234, 236, 238, 240, and 242 performs image processing functions. Image processor 56 may, in the preferred embodiment of this invention, allow processors 220, 224, 232, and 236 to perform standard normalization, background suppression, filtering, and scaling operations. These four processors 220, 224, 232 and 236 operate upon a single channel of image data associated with the output of a single one of the plurality of the multiplexers 189 (FIG. 4). In the same manner, processors 222, 226, 234, and 238 also perform image processing operations upon a different channel associated with an output of a different one of the plurality of multiplexers 189. Accumulator processors 228 and 230 are simply used to detect the values of the brightest and darkest pixels occurring in a received document image. This value is sent to the diagnostic transport interface 72 to aid in the diagnostics as a monitor of the dynamic range characteristics of the digitized image. Drastic changes in the dynamic range would imply failure of the camera assembly 70 (FIG. 2) or an analog component in the image digitizer 48 (FIG. 2).

Size detection processors 240 and 242 are used to provide image size information to interface 72. This physical size of the acquired image is used to correctly display the image after it has been stored by the image storage module 34 (FIG. 1). The length is determined by counting the number of vertical scans output by processors 236 and 238. Although all processing channels operate independently, they all contain, at any instant of time, image data associated with the same document 16. Therefore, the document length calculated by all processors 240 and 242, from all the channels, must be the same. The diagnostic transport interface 72 verifies this as a measure of the integrity of assembly 56.

In the preferred embodiment of this invention, the diagnostic transport interface may activate any or all of the processors 220, 228, 224, 232, 236, or 240 relative to the channel of data they are operating upon, by enabling signals on bus 250. Additionally, any or all of the processors 222, 230, 226, 234, 238, and 242 may be activated relative to the channel of video data they are operating on. The only constraint is that the channels within system 56 must be configured in the same way in order to prevent visible discontinuities or artifacts in the image and to allow correct operation of the channel comparison logic for diagnostics.

Assembly 248 is used in conjunction with the diagnostic test data emanating from the diagnostic RAM 128 (FIG. 3) which is transmitted through signals on bus 94 and then through the resequencer 52 (FIG. 2) until it is passed to image processing system 56 by bus 96. This diagnostic data is then passed by signals on bus 96 to the processors 220, 222, 224, 226, 228, 230, 232, 234, 236 and 238 and the output of these processors 220, 222, 224, 226, 228, 230, 232, 234, 236 and 238 is monitored by the channel compare and parity test assembly 248 which is enabled by the testing signal on bus 96 which was impressed upon bus 96 (FIG. 2) in the resequencer 52. In the image processing system 56, video information is only periodically tested because transient faults in the video should not cause objectionable visible artifacts. Signals involving the synchronization of the image, such as end-of-scan signal on line 208 (FIG. 4) and document present signal on line 206 (FIG. 4) can disrupt the image if subject to a transient failure. These signals 208 and 206 are therefore always compared and checked by assembly 248 and are input thereto by bus 96.

The document present signal on line 206 (FIG. 4) which was placed on bus 96 is also input into the processors 220, 222, 224, 226, 228, 230, 232, 234, 236, and 238 and is also output therefrom as signals on lines 272 and 274, respectively, and are input onto bus 98 and to interrupt generator 246. Processed video output is also generated by processors 220, 224, 232 and 236 and is output on line 276 to bus 98 while processed video output is also generated by processors 222, 226, 234 and 238 associated with another channel of data and it is output on bus 278. Both signals on buses 276 and 278 are coupled to bus 98. Additionally, the end-of-scan signal 208 from the buffer read sequencer 178 (FIG. 4) (which was placed upon bus 96 in the resequencer 52) is also input into processors 220, 222, 228, 230, 224, 226, 232, 234, 236, 238, 240 and 242 and is output therefrom as a signal on lines 280 and 282 which are also coupled to bus 98.

It has been found that by assigning eight separate channels of video image data to be processed independently in the manner set forth within image processing system 56, that the acquired image data may be processed in a highly efficient and timely manner resulting in a better overall system performance. Additionally, interrupt generator 246 generates a standard type interrupt to the diagnostic transport interface 72 by signals on bus 270 When the document present signals on buses 272 and 274 are deactivated indicating to interface unit 72 that the processing of a document 16 is complete. Additionally, the outputs of the compare and parity test assembly 248 are sent by bus 252 to diagnostic interface unit 72 so that the interface unit 72 may register the results of the test for later use. Also, at this time, the diagnostic transport interface 72 reads all pertinent information for the processed document image from the accumulators 228 and 230; image length from the size detectors 240 and 242; and image heights in each channel from the scaling processors 236 and 238.

The scaling processors 236 and 238 contain accumulators and sequential logic that monitors the highest and the lowest occurrence of a document image in a channel. The diagnostic transport interface 72 gathers this data from all channels when it receives the aforementioned processing complete interrupt by signals on bus 270. Interface 72 uses this information to direct the transposer/compressor assembly 60 to begin compression and to accordingly stop compression. In this way, background information, occurring above and below the image, is not compressed. By not compressing this information, a clearer visual display is produced, storage requirements are reduced, and the system 56 operates more efficiently.

Referring now to FIG. 6, there is shown details of a transposer/compressor assembly 60 of FIG. 2 having transposer buffers 300, 302, 304 and 306, predictors 308, 310, 312 and 314, reorderers 316, 318, 320 and 322, run length counters 324, 326, 328 and 330, encoders 332, 334, 336 and 338, compare assembies 340 and 342, channel compare assemblies 344 and 346 and multiplexers 348 and 349. Entities 300, 302, 308, 310, 316, 318, 324, 326, 332, 334, 344, and 348 correspond to a single channel of output data that was placed upon bus 98 by processor 56 while the entities 304, 306, 312, 314, 320, 322, 328, 330, 336, 338, 349, and 346 relate to a second and different channel of data associated with bus 98. Therefore, the following descriptive discussion will detail the processing by transposer/compressor assembly 60 of a single channel of output data upon bus 98. It should be apparent to one of ordinary skill in the art that this discussion is equally applicable to the processing associated with a second and other channel of data appearing thereon.

Specifically, transpose buffers 300 and 302 are coupled to the input of the predictors 308 and 310 and into the input of channel comparator assembly 344 by signals on buses 350 and 352, respectively. The outputs of the predictors 308 and 310 are coupled to the reorderer processors 316 and 318 and to assembly 344 by signals on buses 354 and 356 respectively. The outputs of the reorderer processors 316 and 318 are coupled to the input of run length counters 324 and 326 and to assembly 344 by signals on buses 358 and 360 respectively. The outputs of the run length counters 324 and 326 are coupled to assembly 344 and to encoders 332 and 334 by signals on buses 362 and 364 respectively. The output of the encoder 332 is coupled to the comparator 344 and to compare assembly 340 by signals on bus 366 while the output of encoder 334 is coupled to the comparator assembly 342 and to comparator 344 by a signal on the bus 368.

The output of the encoder 336 is coupled to the input of comparator 346 and to assembly 340 by signals on bus 370 while the output of the encoder 338 is coupled to the comparator assembly 342 and to assembly 346 by signals on bus 372. Additionally, comparator assemblies 340 and 342 are coupled to the diagnostic transport interface 72 by signals on bus 374 while encoders 332, 334, 336 and 338 are coupled to the diagnostic transport interface by signals on bus 376.

In the preferred embodiment of this invention, each transposition and compression channel is implemented redundantly for purpose of real time fault detection. In entities 300, 308, 316, 324 and 332, transient faults can result in considerable corruption of the displayed image. A redundant path composed of entities 302, 310, 318, 326 and 334 and channel compare assembly 344 allows these faults to be relatively easily detected during operations of assembly 60.

In operation, processed image channel data is received into transposer buffers 300 and 302 by signals on bus 98 (FIG. 2) and is converted from a vertical image segment to that of a horizontal row in order that the subsequent compression may be more efficient. Each of the transposer buffers 300, 302, 304, and 306 comprises memory and associated sequential control logic that strips off the overscan and underscan pixels from the incoming data upon bus 98 and stores the processed segmented data in a form that allows it to be accessed at a later time. Buffers 300 and 302 output this data onto buses 350 and 352 respectively, as a series of pixels comprising rows of the acquired image with the progression proceeding from the lower right hand corner of the image to the lower left hand corner and from the bottom of the image to the top. The interface 72 notifies buffers 300 and 302, by signals on bus 378, as to whether the image camera assembly 70 (FIG. 2) scanned the document 16 from bottom to top or from top to bottom and whether the camera assembly 70 scanned the document 16 from right to left or from left to right so that it may accordingly output the pixels in the aforementioned manner.

Buffers 300 and 302 use this received information to determine where, in memory, to find the lower right corner of the document image and how to increment the memory address in order to output the required sequence of pixels. This feature in conjunction with multiplexers 189 on resequencer 52 (FIG. 4) provide for a normal presentation of the image of document 16 regardless of the motion of document 16 relative to camera 70 as of scan direction associated therewith. The transposer buffers 300 and 302 do not, in the preferred embodiment of this invention, accept the test images initiated from diagnostic RAM 128 (FIG. 3), because assembly 60 has the aforementioned dual redundancy for all segment channels associated therewith and this sort of diagnostic testing is not necessary.

Transposer buffers 300 and 302 are substantially always ready to accept image data associated with document 16. Specifically, the diagnostic transport interface 72, by signals on bus 378, initiates the output of data from buffers 300 and 302 by specifying the number of rows of image data buffers 300 and 302 should output based upon received signals on bus 250 from size detect processor 240 (FIG. 5). Interface 72 then writes this information to all buffers 300, 302, 304 and 306.

Buffers 300 and 302 then output these transposed rows of image data to predictors 308 and 310, respectively, by means of signals on buses 350 and 352. Predictors 308 and 310 then are used to predict for compression purposes, the pixels contained within the output of the transposed buffers 300 and 302. These differences, between pixels and the predicted values, are then input to reorderers 316 and 318 via signals on buses 354 and 356, respectively, to reorder "high confidence" and "low confidence" prediction values in order to obtain a higher run length. The outputs of the reorderers 316 and 318 are input into run length counters 324 and 326 respectively, by signals on buses 358 and 360. Counters 324 and 326 generate run lengths which are input into Huffman encoders 332 and 334 by signals on buses 362 and 364 in order to obtain encoded compressed data. This compressed data is then output as compressed data on bus 366 and 368 as a serial bit streams.

In the preferred embodiment of this invention, comparator assembly 344 is continuously used for comparison purposes in order to ensure the quality of the data compression. In general, signals on buses 350 and 352 are input into assembly 344 and are compared for errors therein as are the outputs of predictors 308 and 310, reorderers 316 and 318, counters 324 and 326, and encoders 332 and 334. These errors are then output to the diagnostic transport interface 72 by signals on bus 380. Additionally, cross channel comparison is accomplished by the use of comparison assemblies 340 and 342. That is, the diagnostic transport interface unit 72, by signals on bus 374, will cause the outputs of the encoders 332 and 336 to be compared by assembly 340 while causing the outputs of encoders 334 and 338 to be compared by assembly 342. The results of these comparisons are then input into diagnostic transport interface 72 by signals on bus 374. These cross channel comparisons are used when diagnostic data from diagnostic RAM 128 (FIG. 3) is sent in the previously defined manner through image processor 56 and on to bus 98. This diagnostic information is then transferred through transposer/compressor assembly 60 and the results compared within comparison assemblies 340 and 342.

Specifically, the cross channel comparators 340 and 342 are used to provide interface 72 with information required to isolate faults to one of the two aforementioned paths comprising a segment channel. The operation of these comparators 340 and 342 is enabled only for diagnostic purposes while documents 16 are not passing by camera assembly 70 (FIG. 2). The diagnostic procedure required to isolate a failing path is as follows.

First, the interface 72 must load the diagnostic RAM 128 (FIG. 3) with a test pattern in the aforementioned manner. This test pattern must be defined such that it simulates the general appearance of document 16. For example, the test pattern must have approximately 16 scans of black valued pixel data followed by a test sequence that has sufficient brightness associated therewith to trigger the document edge detection assembly 174 (FIG. 4) in the aforementioned manner. This test sequence must be followed by at least 16 scans of black pixel data.

The interface 72 then loads the edge detection assembly 174, in the aforementioned manner, and then instructs the diagnostic RAM 128 to output its contents only once in the manner previously specified. In this way, an artificial test document is sent through the resequencer 52 and processor 56 (FIG. 2).

The interface 72 enables the cross channel comparators 340 and 342 by signals on bus 374, and enables the buffers 300, 302, 304 and 306 by signals on bus 378. Because the data is the same on all of the channels, the output of the encoders of two different channels (i.e. 332 and 336 or 334 and 338) are compared.

Previous to initiating this test, the interface 72 may have determined through comparator 344 and 346 and signals on bus 380 that a particular channel was experiencing faults. By repeatedly running this aforementioned diagnostic test, it would be possible to isolate the fault to one of the paths comprising the channel with the aid of the cross channel comparators 340 and 342.

If the fault is isolated to a particular path in one channel by these diagnostics, then the correctly functioning path can be selected, by use of bus 383, for output to the compressed data buffers 64 and 66 (FIG. 2) by the interface 72 by defining the desired output path by signals on bus 383 to multiplexer 348 and 349 which are coupled to the output of encoders 332 and 334; and 336 and 338 respectively. This allows for system 24 to operate correctly until proper servicing is accomplished.

Referring now to FIG. 7, there is shown further details of a compressed data buffer 64 of FIG. 2 having a plurality of serial to parallel converters 400(a–h), each of which corresponds to a single channel of video compressed data associated with transposer/compressor assembly 60 (FIG. 2 and 6) and output via signals on bus 100. Each of the serial to parallel convertors 400(a–h) has its output coupled to input multiplexer 402 by signals on bus 404. The output of multiplexers 402 is input into buffers 406, 408 and 410 by signals on bus 412. The outputs of buffers 406, 408 and 410 are input into a packer 414 by signals on bus 416. The output of packer 414 is input into buffers 418, 420, 422 and 424 by signal on bus 426. The output of buffers 418, 420, 422 and 424 is placed upon a signal on bus 102 which is input into the communications processor 74.

Generally, in operation, the compressed video data is input to the plurality of serial to parallel convertors 400(a–h) each of which is uniquely associated with a single video data channel. Convertors 400(a–h) convert each of the compressed video channels into a parallel fashion and then multiplexers 402 operate to place these channels of data into buffers 406, 408 and 410 for temporary storage therein. The output of buffers 406, 408 and 410 is then sent to a packer 414 which packs the data contained therein to one contiguous block which is placed within buffers 418, 420, 422 and 424 by signals on bus 426. This block of compressed data is then sent to the communication processor 74 for later transmittal to storage module 34 (FIG. 1).

Specifically, the operation of converters 400(a–h) is initiated by the reception of a signal on bus 100 from any one of the assemblies 60 or 62 (FIG. 2). Each converter 400(a–h) converts each group of eight incoming serial bits, on bus 100, into a byte. After a byte of data is accumulated, it is transferred to the bus 412 and the accumulation of a new byte begins.

Input multiplexer 402 scans the outputs of the converted 400(A–H) in sequence. If any of the converters 400(a–h) has a byte available as an output, multiplexer 402 transfers that byte, by signal on bus 404, to the currently used buffer 406, 408 or 410.

Each of these buffers 406, 408 and 410 stores all channels of compressed data associated with one of the documents 16. The data for each channel is written into a separate 16K byte partition in the buffer's memory. This has been found to be sufficiently large to prevent the truncation of the compressed data on anY channel. Loading of the buffers 406, 408 and 410 ceases upon the end of compression associated with assemblies 60 and 62 (FIG. 2).

At this time, the buffers 406, 408 and 410 begin outputting their stored compressed image segments to packer 414 by signals on bus 416. The three input buffers 406, 408 and 410 allow for buffering of up to two additional images while one is being output to packer 414.

As packer 414 forms a contiguous block of data, it sends the data associated with a unique document 16 to each of the buffers 418, 420, 422 and 424. These buffers 418, 420, 422 and 424 allow for up to three images to be packed while one is being read by the communications processor 74. If any of the buffers 406, 408, 410, 418, 420, 422, or 424 are overwritten because of a hardware fault or because they were not empty when next written to, a fault code is sent thereby to communication processor 74.

Referring now to FIG. 8, there is shown the diagnostic transport interface 72 as containing a triport random access memory 430 coupled to a microprocessor 432 by signals on bus 434 and coupled to controller 20 (FIG. 1) by signals on bus 32 and to communications processor 74 by signals on bus 92. It should be noted that in this discussion, the term "triport" is used to define the accessibility of memory 430 by signals on buses 32, 434, and 92. Control thereby is established by means of a typical arbitration scheme contained within memory 430. Microprocessor 432 further contains a communication interface portion 436 coupled, thereto by signals on bus 438. Microprocessor 432 (under stored program control) is further coupled to sensor interface 440 by signals on bus 442.

Triport RAM 430 receives a signal on bus 32 from the controller 20 associated with the system 10 to uniquely identify each of the documents whose image has been processed and sent to the communications processor 74. Microprocessor 432 receives inputs from sensor assembly 46 by signals on bus 88 indicating periods of inter-document time gaps which may be used in the previously specified manner for a diagnostic testing associated with system 24. Communication interface 436 is used by the diagnostic transport interface to communicate with entities 48, 50, 52, 54, 56, 58, 60 and 62 in the aforementioned manner such that microprocessor 432 monitors and controls system 24 and monitors the state of the diagnostic tests as set forth previously.

Microprocessor 432 is also coupled to camera assemblies 68 and 70 (FIG. 1) by signals on buses 82 and 86 respectively in order to control illumination sources associated therewith.

While the invention has been described in connection with the presently preferred embodiment, the principles of the invention are capable of modification and change without departing from the spirit of the invention as set forth in the appended claims.

What is claimed is:

1. In a pipelined image processor for generating and processing image data corresponding to the image of at least a first portion of a document, the pipelined image processor including at least one pipe comprising sequentially coupled image data resequencer, image data processor, and image data transposer/compressor assemblies, wherein said image data is processed by said image data resequencer, image data processor, and said image data transposer/compressor assemblies in a plurality of parallel channel, each channel corresponding to a segment of at least a first portion of the document, said pipelined image processor including diagnostic apparatus for determining correct operability of the pipelined image processor, said diagnostic apparatus comprising:
    communication means, coupled to said image data resequencer, image data processor, and to said transporter/compressor for transmitting data to said resequencer, image data processor, and to said transposer/compressor and for receiving data therefrom; and
    controller means, coupled to said communication means, for receiving and storing said data received by said communication means and for monitoring such data.

2. In a pipelined image processor for generating and processing image data corresponding to the image of at least a first portion of one of a plurality of documents which are separated in timed by an inter-document time gap, the pipelined image processor including at least one pipe comprising sequentially coupled image data digitizer, image data resequencer, image data processor, and image data transposer/compressor assemblies, wherein said image data contains a plurality of segments and wherein each segment is independently processed by said image data resequencer, image data processor, and said image data transposer/compressor assemblies, wherein said pipelined image processor includes diagnostic apparatus for determining a correct operability of the pipelined image processor, said diagnostic apparatus comprising:
    sensor means for sensing said inter-document time gap and for producing an indication thereof;
    diagnostic memory means, coupled to said image digitizer, for storing a diagnostic data test pattern;
    controller means, coupled to said diagnostic memory means and to said sensor means for receiving said indication of said inter-document time gap and in response thereto, for causing said diagnostic data test pattern to be communicated to said image data resequencer, to said image data processor, and to said image data transposer/compressor assemblies and for causing said assemblies to respond thereto and for determining faults associated with each of said assemblies by monitoring each of said responses to said diagnostic data test pattern.

3. A pipelined image processor for generating and processing data corresponding to an image of at least a first portion of a document, said data being separable into a plurality of vertical columns with each column containing a plurality of segments, said pipelined image processor comprising:
    a first pipe including:
        means for generating an electrical signal in response to image information contained in said first portion of said document,
        means for generating digitized information corresponding to each segment of said first portion of said document from said electrical signal,
        means for generating resequenced information corresponding to each segment of said first portion of said document form the digitized information,
        means for generating processed information corresponding to each segment of said first portion of said document from the resequenced information,
        means for generating transposed information formed by transposing the processed information from vertical image segments to horizontal rows of processed information and for compressing the transposed information,
        means for storing said transposed and compressed information corresponding to each segment of said first portion of said document; and
    diagnostic means for determining the operability of said first pipe.

4. The pipelined image processor of claim 3, wherein said diagnostic means comprises a random access memory operable to deliver a diagnostic data test pattern to said first means for generating digitized information.

5. The pipelined image processor of claim 4, wherein said diagnostic data test pattern for each segment is identical.

6. The pipelined image processor of claim 5, wherein said diagnostic means further comprises a first means for comparing, said first means operable to determine whether an output of said means for generating resequenced information is identical for each of said segments when said diagnostic data test pattern is delivered to said means for generating digitized information.

7. The pipelined image processor of claim 5, wherein said diagnostic means further comprises second means for comparing, said second means operable to determine whether an output of said means for generating processed information is identical for each of said segments when said diagnostic data test pattern is delivered to said means for generating digitized information.

8. The pipelined image processor of claim 5, wherein said diagnostic means further comprises third means for comparing, said third means operable to determine whether an output of said means for generating transposed and compressed information is identical for each of said segments when said diagnostic data test pattern is delivered to said means for generating digitized information.

9. A method for testing the operability of a pipelined image processor said pipelined image processor operable to generate data corresponding to an image of a vertical column of a document, said pipelined image processor comprising:
   (a) a camera assembly for generating a plurality of electrical signals in response to image information contained in said column of said document,
   (b) an image digitizer for generating digitized information from said electrical signals,
   (c) a resequencer for generating resequenced information corresponding to each segment of said document from the digitized information,
   (d) an image processor for generating processed information from the resequenced information,
   (e) a transposer/compressor assembly for generating transposed information formed by transposing the processed information from vertical image segments to horizontal rows of processed information and for compressing the transposed information; and
   (f) a compressed data buffer for storing said transposed and compressed information;
   said method comprising the steps of;
      generating test data corresponding to each segment of said column;
      delivering said test data to said image digitizer; and
      determining whether said resequencer, said image processor and said transposer/compressor assemblies are operable by comparing the output of said resequencer, said image processor, and said transposer/compressor assembly for each segment.

10. The method of claim 9, comprising an addition step of determining proximity of said document to said camera assembly.

11. The method of claim 9, wherein said step of determining whether said resequencer, said image processor and said transposer/compressor assembly are operable comprises the step of determining whether outputs of said resequencer for the test data corresponding to each segment are equal.

12. The method of claim 9, wherein said step of determining whether said resequencer, said image processor and said transposer/compressor assembly are operable comprises the step of determining whether outputs of said image processor for the test data corresponding to each segment are equal.

13. The method of claim 9, wherein said step of determining whether said resequencer, said image processor and said transposer/compressor assembly are operable comprises the step of determining whether outputs of said transposer/compressor assembly for the test data corresponding to each segment are equal.

14. The method of claim 10, comprising an additional step of permitting a diagnostic transport interface to synchronize testing of said pipelined image processor with the proximity of said document to said camera assembly.

* * * * *